United States Patent Office 2,826,483
Patented Mar. 11, 1958

2,826,483
METHOD OF STABILIZATION OF SULPHURIC ANHYDRIDE

Henri Eugéne Jean Fohanno, Colombes, France, assignor to Manufactures de Produits Chimiques du Nord Etablissements Kuhlmann, Paris (Seine), France, a corporation of France No Drawing. Application August 7, 1953
Serial No. 373,058

Claims priority, application France October 24, 1952

8 Claims. (Cl. 23—174)

The present invention relates to a method of stabilization of sulphuric anhydride which is very efficacious and advantageous.

It is known that for a high number of reactions of organic chemistry and, more particularly, for numerous reactions of sulphonation it is advantageous to use free sulphuric anhydride ($SO_3$) which has a more energetic reactivity than 100% sulphuric acid or even oleum.

Unfortunately, the use of sulphuric anhydride in the free state encounters serious difficulties in manipulation and in preservation, because of its instability.

As a matter of fact it is known that the pure liquid sulphuric anhydride sets in a mass when it is kept at ordinary temperatures. It will be recalled that there are three forms of sulphuric anhydride, melting at 17° C. (form $\gamma$), at 32.5° C. (form $\beta$) and at 62° C. (form $\alpha$). The form $\alpha$ is stable, both other forms being metastable.

Various means have already been suggested for obtaining the stabilization of sulphuric anhydride in the liquid state and at the ordinary temperature.

The French Patent No. 843,949, filed on March 21, 1938, in the name of Rhodiaceta proposes the use of fatty acids or of fatty acid anhydrides in a proportion varying from 0 to 10%; the U. S. Patent No. 2,403,459, filed on November 29, 1943, in the name of du Pont de Nemours, recommends thionyl chloride; the U. S. Patent No. 2,458,718, filed on February 9, 1946, in the name of The Allied Chemical and Dye Corporation describes the use of boron compounds (boracic anhydride, boron halogenides, borax, fluoborates, boracic acids and the like); another patent of The Allied Chemical and Dye Corporation, the U. S. Patent No. 2,492,706 of September 24, 1948, uses as a stabilizing agent for sulphuric anhydride, methyl borate or the methyl etherate of the boron trifluoride in a proportion of at most 0.6% by weight of boron; lastly, the U. S. Patent No. 2,511,072 of April 9, 1949, of the same company uses the pentafluoride, or the pentachloride of antimony in the proportion of at least 6% by weight.

These various stabilizing agents proved, moreover, to be of a rather unequal value and it seems that only the derivatives of boron were adopted in industrial practice. However, their use is not without any difficulty; the U. S. Patent No. 2,458,718, more particularly, states that it is necessary to heat between 60° and 100° C., i. e. under pressure, during a time varying from 2 to 10 hours after the addition of the stabilizing agent. Moreover, methyl borate and the methyl etherate of boron fluoride have the drawback that they give rise in contact with the sulphuric anhydride to very exothermic reactions leading to highly coloured mixtures.

The present invention has for its object to stabilize the sulphuric anhydride in its liquid form $\gamma$, above 17° C., under easy conditions and with simple means making it possible to avoid the inconveniences of the other above mentioned methods.

The method of stabilizing sulphuric anhydride in accordance with the invention consists in introducing small quantities of methyl sulphate generally comprised between 0.1 and 1% by weight, preferably of the order of 0.4 to 0.5%, into the said sulphuric anhydride. No other treatment than those having for their object to attain a homogeneous mixture is to be taken into consideration during or after the addition of the stabilizing agent.

It is found that the so treated sulphuric anhydride remains perfectly liquid at the ordinary temperature even after a storage time of several months. If it is cooled below 17° C. it slowly solidifies to a block of crystals which when heated to normal temperature liquefy again in a very reversible manner.

It happens that in vessels which contain sulphuric anhydride which has been stabilized in accordance with the present invention and chiefly in the upper parts of the said vessels, formation of small crystals is observed when traces of moisture are present. But these crystals do not develop and when they come into contact with the liquid they do not dissolve therein nor do they cause the crystallization of the liquid mass.

The methyl sulphate acts in some manner as an inhibiter of the polymerization of the metastable forms of $SO_3$. It initiates no troublesome action in most of the application of the liquid sulphuric anhydride. The product stabilized in accordance with the invention may be stocked in apparatus of the same materials as those which are currently used for stocking and using concentrated oleum: the stabilizing action is not interfered with by the presence of ferrous metals and the latter are not substantially attacked by the stabilized product.

The method in accordance with the present invention may be carried into practice either by adding methyl sulphate to the sulphuric anhydride in which case the introduction of the methyl sulphate may take place in a continuous manner into the sulphuric anhydride itself obtained in a continuous manner in the pure state by any known industrial method, or by distilling the sulphuric anhydride on the correct quantity of methyl sulphate.

Moreover, the invention is not restricted to a predetermined mode of operation: it essentially relates to the stabilizing action of neutral methyl sulphate.

More particularly, the formation of the said sulphate in situ as, for example, through the introduction of methyl oxide or of any other reagent which may give rise to the production of methyl sulphate may be taken into consideration without departing from the principles of the present invention.

In order to illustrate the application of the invention the following examples are given, which particularly describe various working methods as well as the characteristic features of the sulphuric anhydride stabilized in accordance with the invention.

Example 1

2.15 g. of neutral methyl sulphate were first put into a glass vessel provided with a ground flanged socket and then 486.5 g. of sulphuric anhydride were caused to flow thereinto (by distillation of oleum with about 70% of free $SO_3$) thereafter the vessel was closed and stirred in order to render the mixture homogeneous. This mixture remained perfectly liquid at the ordinary temperature: when placed in a cool room it coagulated into a block of crystals having the appearance of ice, a characteristic feature of the $\gamma$ form of $SO_3$, and melted entirely again when brought again above 17° C. The proportion of stabilizing agent was 0.44%.

Example 2

In a vessel provided with a ground flanged socket and perfectly dried previously, 240.5 g. of $SO_3$ were first distilled while taking all precautions to avoid the introduction of traces of moisture, then 1.44 g. or 0.59% of methyl sulphate, separately weighed in a perfectly dry vessel, were poured thereon.

After several weeks the mixture thus formed remained perfectly stable, limpid and colourless; the variations of temperature entailed the same changes of state as those which were mentioned in Example 1.

Example 3

In a vessel similar to the preceding ones but in which well polished and dried metallic test pieces had previously been placed, 477 g. of sulphuric anhydride were distilled and then 2.16 g. or 0.45% of neutral methyl sulphate were rapidly poured thereon, thereafter the vessel was closed and stirred with care in order to render the content homogeneous.

After several weeks the liquid thus treated remained limpid and colourless; the test pieces one of which consisted of a small plate of ordinary mild steel and the other of a small prism of common grey pig iron remained brilliant and showed no visible traces of attack.

Example 4

A mixture containing 0.95 g. of methyl sulphate to 501 g. of $SO_3$, i. e. 0.19% was prepared in a manner similar to that which is mentioned in Example 1. The mixture remained liquid during several days without appearing to show any tendency to crystallize. When the latter was produced by an intensive cooling it was found on subsequent heating that some flakes of crystals having the appearance of asbestos, which is the characteristic feature of the $\alpha$ and $\beta$ forms, subsisted in the middle of the liquid and remained in the solid state when the temperature of the whole was brought to 35 to 40° C. while stirring from time to time. At this temperature the $\beta$ modification would have melted; the crystals were thus $\alpha$ anhydride. But when protected against any penetration of moisture the mixture then remained perfectly stable. Cooling caused the formation of $\gamma$ crystals therein which melted again in an entirely reversible manner.

Example 5

After having stabilized 783 g. of $SO_3$ by means of 3.93 g. of methyl sulphate, i. e. very approximately 0.5%, the mixture obtained was subjected to distillation in a suitable appliance. It was sufficient to heat by means of a quite small flame and to bring the mixture to 50° C. in order to obtain a regular distillation of $SO_3$. The whole operation was made in three steps separated by intervals of several days. Each time the distillate coagulated in a few hours to a solid block having the appearance of asbestos—$\alpha$ anhydride—while the residue remained perfectly stable in the balloon-flask in the form of a colourless liquid.

Only at the end of the last phase a more intense heat was applied: the formation of some white smoke was observed and the residue assumed a substantial colour; its weight did not even reach 10 g.

The successive distillates were subjected to new distillations and they entirely vaporized without leaving any residue. Thus there had been no entrainment of methyl sulphate during the first distillation; the whole of said sulphate remained in the residue where it was easily detected.

It is sure, therefore, that if any chemical operations such as, for example, sulphonations are effected with products stabilized in accordance with the present invention, by the procedure of distilling away $SO_3$ in a vaporous state no introduction of impurities due to the presence of methyl radicals will have to be feared.

If similar operations are directly made with the stabilized liquid the production of methylated derivatives is possible; however, owing to the very small proportion of methyl sulphate which is necessary for stabilization, the percentage of such impurities can be only small.

What I claim is:

1. A method of stabilizing liquid sulphuric anhydride so that it remains liquid and substantially free from polymerization, which consists in adding a proportion of neutral methyl sulphate comprised between 0.1 and 1% by weight to the sulphuric anhydride.

2. A method as claimed in claim 1, in which the proportion of neutral methyl sulphate introduced in the sulphuric anhydride is comprised between 0.4 and 0.5% by weight.

3. A method as claimed in claim 1, in which the methyl sulphate is added directly to the sulphuric anhydride.

4. A method as claimed in claim 1, in which the sulphuric anhydride is distilled in the presence of methyl sulphate so as to carry away the desired proportion of said methyl sulphate.

5. A stabilizing agent for liquid sulphuric anhydride constituted by neutral methyl sulphate added to the said sulphuric anhydride in proportions varying between 0.1 and 1% by weight.

6. A method of stabilizing liquid sulphuric anhydride by the formation in situ of a proportion of between 0.1 and 1.0% by weight of neutral methyl sulphate, the said methyl sulphate being formed in the anhydride solution by the addition of a compound containing a reactive methyl radical to the said solution.

7. A method as claimed in claim 6, in which the said methyl radical added is contained in methyl oxide.

8. Liquid sulfuric anhydride as stabilized by the presence of 0.1 to 1% of neutral methyl sulfate.

References Cited in the file of this patent

UNITED STATES PATENTS

| | | |
|---|---|---|
| 1,399,238 | Adamson | Dec. 6, 1921 |
| 1,401,693 | Haworth et al. | Dec. 27, 1921 |
| 2,240,935 | Lepin | May 6, 1941 |
| 2,716,594 | Harris et al. | Aug. 30, 1955 |